(12) United States Patent
Huang et al.

(10) Patent No.: US 10,270,344 B2
(45) Date of Patent: Apr. 23, 2019

(54) MULTIPHASE VOLTAGE CONVERTER WITH COUPLED INDUCTORS OF REDUCED WINDING LOSS AND CORE LOSS

(71) Applicants: Wenkang Huang, East Greenwich, RI (US); Bradley M. Lehman, Belmont, RI (US)

(72) Inventors: Wenkang Huang, East Greenwich, RI (US); Bradley M. Lehman, Belmont, RI (US)

(73) Assignees: Wenkang Huang, East Greenwich, RI (US); Bradley M. Lehman, Belmont, MA (US)

( * ) Notice: Subject to any disclaimer, the term of this patent is extended or adjusted under 35 U.S.C. 154(b) by 25 days.

(21) Appl. No.: 15/424,895

(22) Filed: Feb. 6, 2017

(65) Prior Publication Data

US 2018/0025832 A1    Jan. 25, 2018

Related U.S. Application Data

(60) Provisional application No. 62/264,006, filed on Dec. 7, 2015.

(51) Int. Cl.
*H02M 3/158* (2006.01)
*H01F 27/24* (2006.01)
*H01F 27/28* (2006.01)
*H01F 27/40* (2006.01)

(52) U.S. Cl.
CPC .......... *H02M 3/1584* (2013.01); *H01F 27/24* (2013.01); *H01F 27/28* (2013.01); *H01F 27/40* (2013.01)

(58) Field of Classification Search
CPC ... H02M 3/1584; H02M 3/1588; H01F 27/34; H01F 27/24; H01F 27/28; H01F 27/40
See application file for complete search history.

(56) References Cited

U.S. PATENT DOCUMENTS

| | | | |
|---|---|---|---|
| 7,199,695 B1 * | 4/2007 | Zhou | H01F 37/00 336/212 |
| 7,317,305 B1 * | 1/2008 | Stratakos | H02M 3/157 323/282 |
| 7,443,146 B2 * | 10/2008 | Wei | H02M 3/1584 323/224 |
| 7,893,669 B2 * | 2/2011 | Osterhout | H02M 3/1584 323/272 |
| 9,379,619 B2 * | 6/2016 | Barnette | H02M 3/33507 |

(Continued)

*Primary Examiner* — Kyle J Moody

(57) ABSTRACT

A multiphase switching DC-DC converter generates an output voltage from an input voltage. The converter includes multiphase coupled inductors having lateral magnetic core and non-looping conductors. The currents in conductors of the inductors flow in opposite directions, and therefore, the coupled inductors are inversely coupled and have a relatively low resistance and relatively small core volume. The reduced resistance of the inductor windings combined with smaller volume of magnetic core in the coupled inductors increases energy conversion efficiency and improves transient response of the converter. The coupled inductors can be employed in buck or boost or buck-boost converters, and they can also be used in buck or boost or buck-boost derived converters with isolation transformers.

19 Claims, 11 Drawing Sheets

(56) References Cited

U.S. PATENT DOCUMENTS

| | | | | |
|---|---|---|---|---|
| 9,618,539 B2* | 4/2017 | Barnette | ............. | G01R 15/146 |
| 2007/0279022 A1* | 12/2007 | Chen | ................... | H02M 3/1584 |
| | | | | 323/272 |
| 2009/0256535 A1* | 10/2009 | Houston | ............. | H02M 3/1584 |
| | | | | 323/262 |
| 2011/0298433 A1* | 12/2011 | Tam | ....................... | H01F 38/00 |
| | | | | 323/282 |
| 2017/0366087 A1* | 12/2017 | Wei | .................... | H02M 3/1588 |

* cited by examiner

MULTIPHASE VOLTAGE CONVERTER WITH COUPLED INDUCTORS OF REDUCED WINDING LOSS AND CORE LOSS

FIELD OF THE INVENTION

The invention relates generally to multiphase switching DC-to-DC voltage converters such as buck or boost or buck-boost converters, and buck or boost or buck-boost derived converters with an isolation transformer.

BACKGROUND OF THE INVENTION

Buck converters are typically used to regulate the voltage of a DC power supply. A multiphase buck converter has several phases connected in parallel, with each phase having a top switch and a bottom switch connected to an inductor. Such multiphase buck converters are well known in the art and are commonly used for providing regulated DC power to loads that require higher current, fast transient response, and high conversion efficiency, such as microprocessors, computer memories, computer graphic processors, telecommunications electronics, and field-programmable gate array and other integrated circuits.

The prior art has sought to increase conversion efficiency and improve transient response of a multiphase buck converter by coupling the inductors of multiple phases. Inductors with inverse coupling tend to decrease output current ripple and, therefore, reduce conduction loss in the switches. However, the extra conductor windings required for inductors with inverse coupling increases resistance of the inductors, which adversely affects the energy conversion efficiency. In another prior art, the woven topology of inductor core required for inductors with inverse coupling increases volume of the magnetic core, which increases power loss of magnetic core and adversely affects the energy conversion efficiency.

It is an objective of the present invention to provide a multiphase buck converter, or boost converter, or buck-boost converter, or buck derived converter, or boost derived converter, or buck-boost derived converter having inversely coupled inductors with exceptionally low winding resistance and small magnetic core volume. Such a voltage converter has exceptionally high current capability, high power conversion efficiency, and fast transient response.

SUMMARY OF THE INVENTION

The present invention provides a buck, boost, buck-boost, buck derived, boost derived, buck-derived voltage converter having a lateral magnetic core and coupled inductors with non-looping conductors.

In a two-phase switching converter, conductors of the coupled inductors are straight and non-looping. Top and bottom switches of the first phase are on one side of the magnetic core, and top and bottom switches of the second phase is on the other side of the magnetic core. The current of the two inductors are in opposite direction. With the unique structure of lateral magnetic core and non-looping conductors, the coupled inductors will be inversely coupled, and will have a low conductor resistance. The inverse coupling improves transient response of the converters. The relatively low resistance in inductor windings and relatively small core volume in magnetic core of the coupled inductors reduce converter power loss and, therefore, increase energy conversion efficiency.

The magnetic core can be placed between two layers of printed circuit boards, and can have air gap to prevent magnetic saturation. The air gap can also be filled with lower permeability magnetic materials or partially filled with a ferromagnetic material to allow tuning of the inductance and coupling coefficient of the coupled inductors.

The converter can be a three-phase converter, in which case the currents in two conductors of the inductors flow in opposite direction to the current in the third conductor, and therefore, the two inductors are inversely coupled to the third inductor.

The converter can be a four-phase converter, in which case the currents in two conductors of the inductors flow in opposite direction to the current in the other two conductors, and therefore, the two inductors are inversely coupled to the other two inductors.

The converter can be a six-phase converter, in which case the currents in three conductors of the inductors flow in opposite direction to the current in the other three conductors, and therefore, the three inductors are inversely coupled to the other three inductors.

The converter can be an eight-phase converter, in which case the currents in four conductors of the inductors flow in opposite direction to the current in the other four conductors, and therefore, the four inductors are inversely coupled to the other four inductors.

The converter can be a single-phase converter, in which case no coupling is required, but the non-looping conductor in the inductor reduces the inductor winding resistance and improves the energy conversion efficiency.

DETAILED DESCRIPTION

The present invention provides multiphase voltage converters having coupled inductors with reduced winding resistance and magnetic core volume. In a conventional, prior art multiphase converter with inversely coupled inductors (i.e. with a negative coupling coefficient), the inductors comprise long electrical conductors wound around a magnetic core. In another prior art multiphase converter with inversely coupled inductors, the inductors comprise long magnetic cores woven around the electrical conductors. In the present invention, the conductors of the coupled inductors are non-looping, and by comparison, the conductors are much shorter. The lateral magnetic core further decreases the length of the conductors. The combination of the non-looping conductors and the lateral magnetic core reduces conductor resistance and magnetic core size. As a result, the inductor power losses are reduced and the conversion energy efficiency of the voltage converter is increased in the present invention. The present invention of coupled inductor design can be used with buck converters, boost converters, buck-boost converters, buck derived converters, boost derived converters, and buck-boost derived converters.

Figure 1:
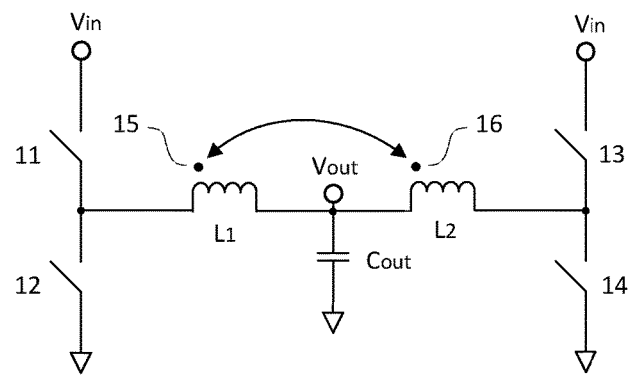
FIG. 1 (Prior Art) shows a circuit schematic of a two-phase buck converter with inverse coupling between inductors.

FIG. 1 shows a schematic diagram of a two-phase buck converter with coupled inductors L1, L2 according to the prior art. Phase 1 has top and bottom switches 11, 12, connected in series between the input voltage source Vin and ground. The two switches are connected at a midpoint to one end of the inductor L1. The inductor L1 is alternately charged and discharged by the switches 11, 12, as known in the art. Phase 2 has top and bottom switches 13, 14, connected in series between the input voltage source Vin and ground. The two switches are connected at a midpoint to one end of the inductor L2. The inductor L2 is alternately charged and discharged by the switches 13, 14. The inductors L1, L2 are inversely coupled, which is indicated by the two linked dots 15, 16 located on opposite sides of the inductors L1, L2 respectively. The other ends of the inductors L1, L2 are tied together to the converter voltage output Vout and output capacitor Cout.

Figure 2:
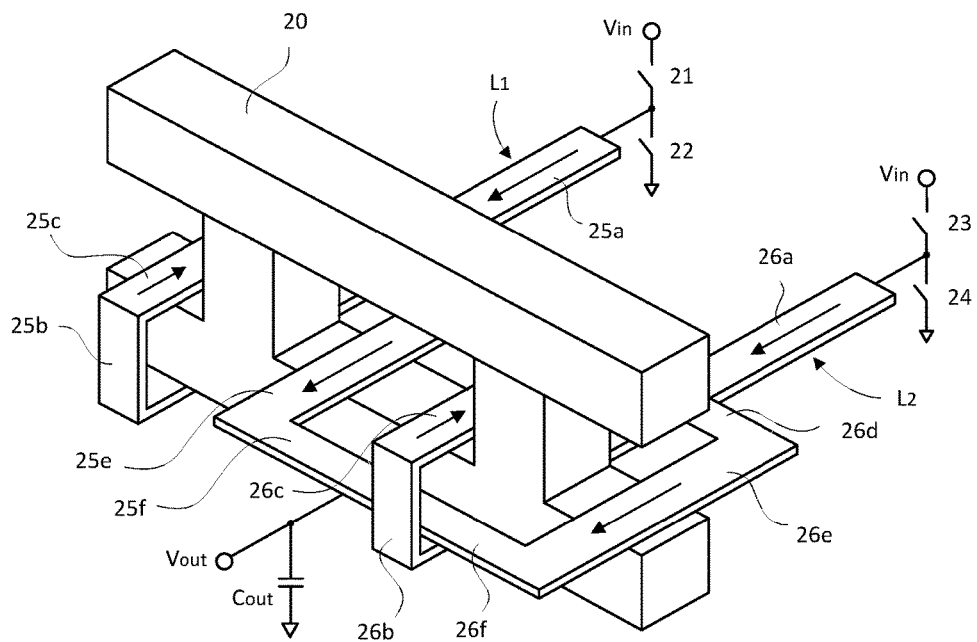
FIG. 2 (Prior Art) shows a conventional implementation of inductors with inverse coupling. The conventional implementation requires long loops for the inverse coupling between inductors.

FIG. 2 shows a perspective view of the inductors and magnetic core 20 of the prior art two-phase buck converter of FIG. 1. The inductor L1 is connected to the midpoint of the top and bottom switches 21, 22, and the inductor L2 is connected to the midpoint of the top and bottom switches 23, 24. Arrows indicate the direction of current flow. The looping conductor of the inductor L1 comprise six sections, 25a, 25b, 25c, 25d, 25e, 25f, and the looping conductor of the inductor L2 comprise six sections, 26a, 26b, 26c, 26d, 26e, 26f. The looping conductors provide inverse magnetic coupling between the inductors L1, L2. It is clear from FIG. 2 that the conductors of the inductors L1, L2 are relatively long loops and, therefore, have a relatively long length. The relatively long length of the looping inductors of the prior art increases the electrical resistance of the inductors. The relatively high electrical resistance of the inductors reduces the energy conversion efficiency of the converter, which is unwanted.

Figure 3:
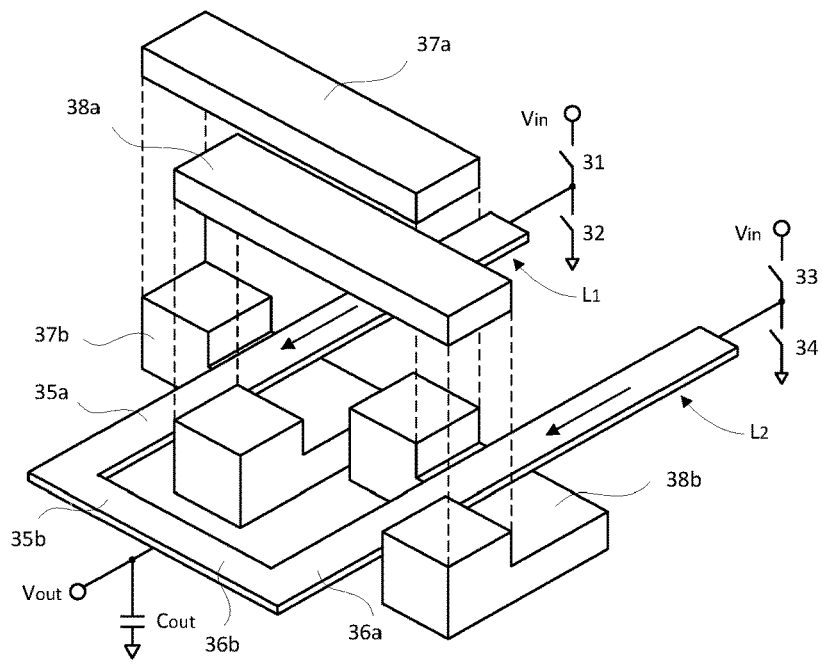
FIG. 3 (Prior Art) shows another implementation of coupled inductors with inverse coupling. The implementation requires a woven core structure for the inverse coupling between inductors.

FIG. 3 shows an exploded perspective view of the inductors and magnetic cores of another prior-art two-phase buck converter of FIG. 1. The inductor L1 is connected to the midpoint of the top and bottom switches 31, 32, and the inductor L2 is connected to the midpoint of the top and bottom switches 33, 34. Arrows indicate the direction of current flow. The conductor of the inductor L1 comprise of two sections, 35a and 35b, and the conductor of the inductor L2 comprise two sections, 36a and 36b. The conductors of the inductors L1, L2 are non-looping. The magnetic cores 37a, 37b, 38a, 38b have a woven topology that provides inverse magnetic coupling between the inductors L1, L2. The woven topology of the magnetic cores 37a, 37b, 38a, 38b means that the magnetic cores are looping around the non-looping conductors of the inductors L1, L2. It is evident from FIG. 3 that the looping magnetic cores increase the core volume comparing to the conventional magnetic core. The relatively larger magnetic core volume increases the core power loss and, therefore, reduces the energy conversion efficiency of the converter, which is undesirable.

Figure 4:
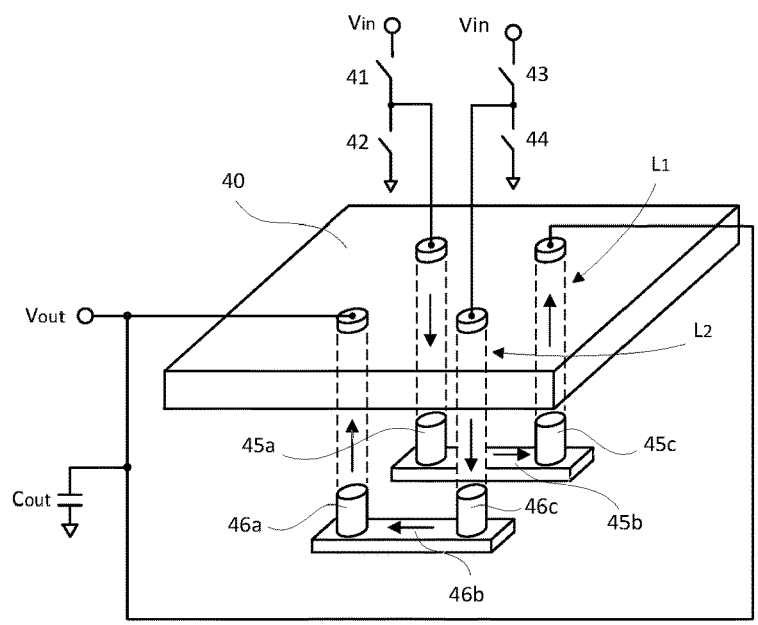
FIG. 4 (Prior Art) shows yet another conventional implementation of coupled inductors with coupling in a lateral core structure. The lateral core implementation requires inductors having looping conductors for the inverse coupling between inductors.

FIG. 4 shows an exploded perspective view of the inductors and magnetic core of another prior-art two-phase buck converter of FIG. 1. The inductor L1 is connected to the midpoint of the top and bottom switches 41, 42, and the inductor L2 is connected to the midpoint of the top and bottom switches 43, 44. Arrows indicate the direction of current flow. The lateral magnetic core 40 has relatively smaller thickness, which reduces the length of the conductors. The looping conductor of the inductor L1 comprise three sections, with the two sections 45a, 45c perpendicular to the magnetic core plane and the section 45b parallel to the core plane. The looping conductor of the inductor L2 comprise three sections, with the two sections 46a, 46c perpendicular to the magnetic core plane and the section 46b parallel to the core plane. The opposite directions of current flow in two conductors of the inductor L1, L2 in FIG. 4 provide inverse magnetic coupling between the inductors L1, L2. It is apparent from FIG. 4 that the conductors of the inductor L1, L2 are relatively long loops and, therefore, have a relatively long length. The relatively long length of the looping inductors of the prior art increases the electrical resistance of the inductors. The relatively high electrical resistance of the inductors reduces the energy conversion efficiency of the converter, which is undesirable.

Figure 5:
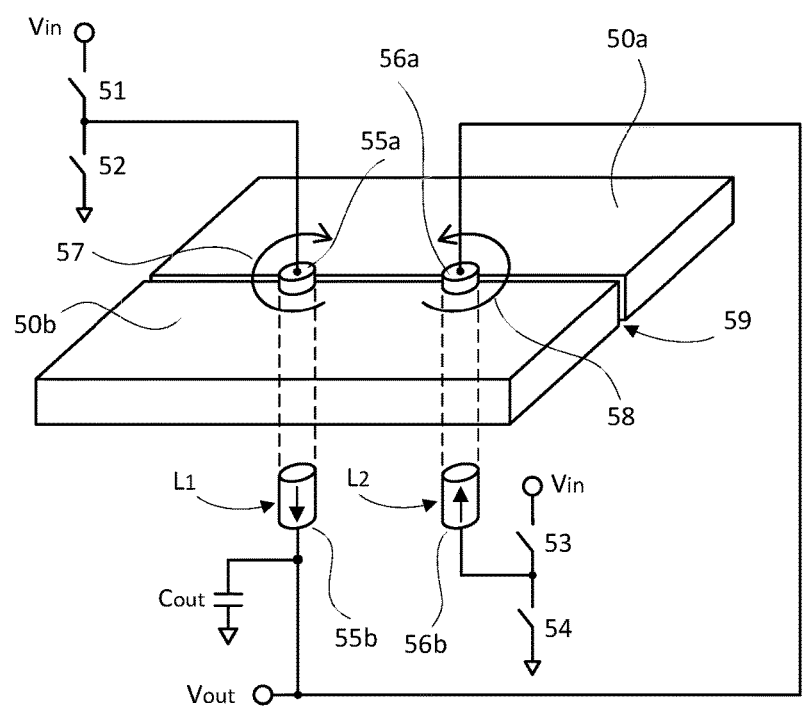
FIG. 5 shows an exploded view of a two-phase buck converter according to the present invention. The inductors are inversely coupled in a lateral magnetic core. The conductors are non-looping and short.

FIG. 5 shows an exploded perspective view of a multiphase buck converter of the present invention. The exemplary buck converter of FIG. 5 has two phases. A first phase includes top and bottom switches 51, 52, and first inductor L1. A second phase includes top and bottom switches 53, 54, and second inductor L2. The two phases operate in parallel and are connected at the converter voltage output Vout. The conductors of inductors L1, L2 are preferably copper wires or vias with plating in a printed circuit board (shown in FIG. 6), but can be any kind of electrical conductor. The cross section of the conductors is preferably round but can be square or any other shapes.

The buck converter of FIG. 5 includes the lateral magnetic cores 50a, 50b and two non-looping conductors of the inductors L1, L2. The magnetic core can be made of any ferromagnetic material such as ferrite or laminated iron or steel. The top end 55a of the conductor of inductor L1 is connected to the midpoint of the switches 51, 52, and the bottom end 55b of the conductor of inductor L1 is connected to the converter voltage output Vout. The top end 56a of the conductor of inductor L2 is connected to the converter voltage output Vout, and the bottom end 56b of the conductor of inductor L2 is connected to the midpoint of the switches 53, 54.

In operation, the inductor L1 receives electrical power from the switches 51, 52, and the inductor L2 receives electrical power from the switches 53, 54, as known in the art. The non-looping conductors of inductors L1, L2, with the described connections to the switches 51, 52, 53, 54 and the converter voltage output Vout, produce opposing magnetic fields within the magnetic cores. Specifically, inductor L1 produces a magnetic field with an orientation indicated by arrow 57, which is opposite of the magnetic field produced by inductor L2 indicated by arrow 58. Hence, the inductors L1, L2 are inversely coupled. It is clear from FIG. 5 that the conductors of inductors L1 and L2 have relatively short length in comparison with the prior art. The relatively short length of the conductors of inductors L1, L2 reduces the electrical resistance of the inductors. The relatively low electrical resistance of the inductors increases the energy conversion efficiency of the converter, which is desirable.

The inductors L1, L2 are coupled by magnetic cores 50a, 50b, which are typically made of ferrite or similar material, as known in the art. The magnetic cores 50a, 50b can have air gap 59 to prevent magnetic saturation and control the coupling coefficient between the inductors L1, L2. The air gap 59 can also be filled with magnetic materials having lower permeability than material of the magnetic cores 50a, 50b or be partially filled with a ferromagnetic material.

Although the exemplary buck converter is two-phase converter, the phase number of the coupled inductor is scalable and can be varied within the scope of the present invention.

In the present specification and appended claims, the shape of the lateral magnetic core and non-looping conductors can be varied within the scope of the present invention. For example, shapes of the magnetic core and conductors can be rectangular or rounded. The shapes of the magnetic core and conductors can be varied in many ways in the present invention.

Figure 6:
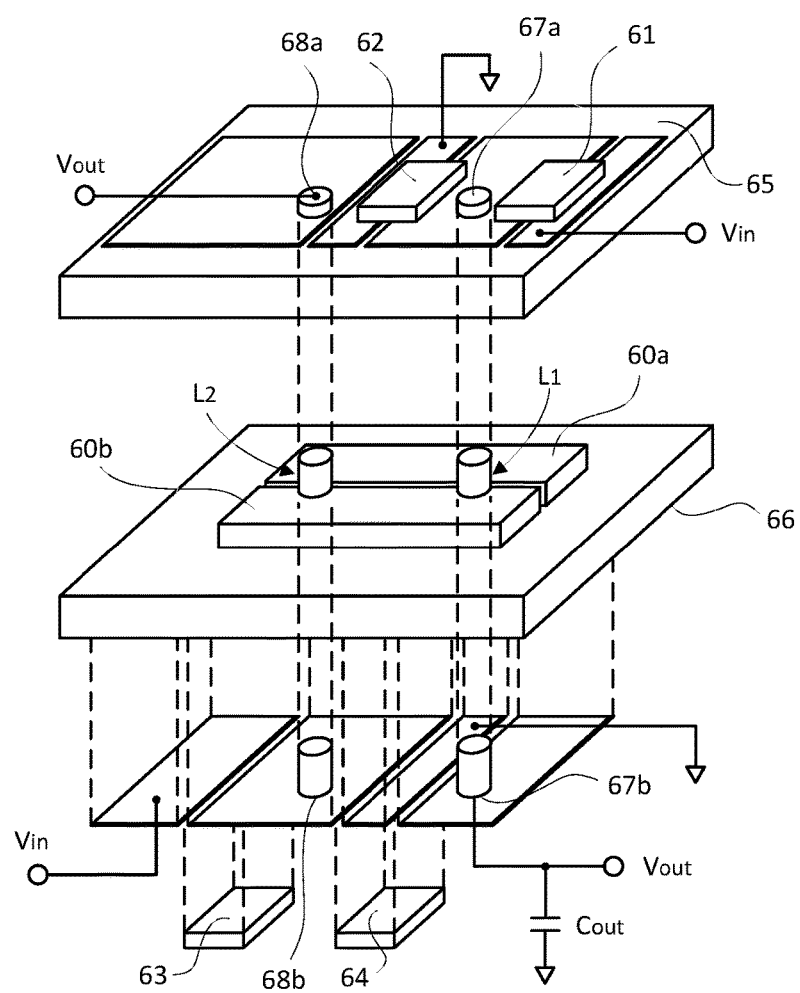
FIG. 6 shows an exploded view of an embodiment in a two-phase converter of the present invention implemented in printed circuit board of a converter module.

FIG. 6 shows an exploded perspective view of a preferred embodiment of the present invention in which the magnetic cores 60a, 60b are embedded between the printed circuit board layers 65, 66 of the converter module. The first top and bottom switches 61, 62 are placed on top side of the printed circuit board layer 65 and connected in series between the input voltage source Vin and ground. The two switches are connected at a midpoint to top end 67a of the conductor of inductor L1. The bottom end 67b of the conductor of inductor L1 is connected to the converter voltage output Vout. All the above connections are through patterned copper foil on the printed circuit board layers.

The second top and bottom switches 63, 64 are connected in series between the input voltage source Vin and ground. The two switches are placed on bottom side of the printed circuit board layer 66 and connected at a midpoint to bottom end 68b of the conductor of inductor L2. The top end 68a of the conductor of inductor L2 is connected to the converter voltage output Vout. All the above connections are through patterned copper foil on the printed circuit board layers.

In the present invention, the conductors of coupled inductors L1, L2 are non-looping and have a relatively short length. So the inductors L1, L2 have a relatively low resistance compared to the prior art coupled inductors. Hence, the present coupled inductor provides higher energy conversion efficiency in a buck or boost or buck-boost converter.

Figure 7:
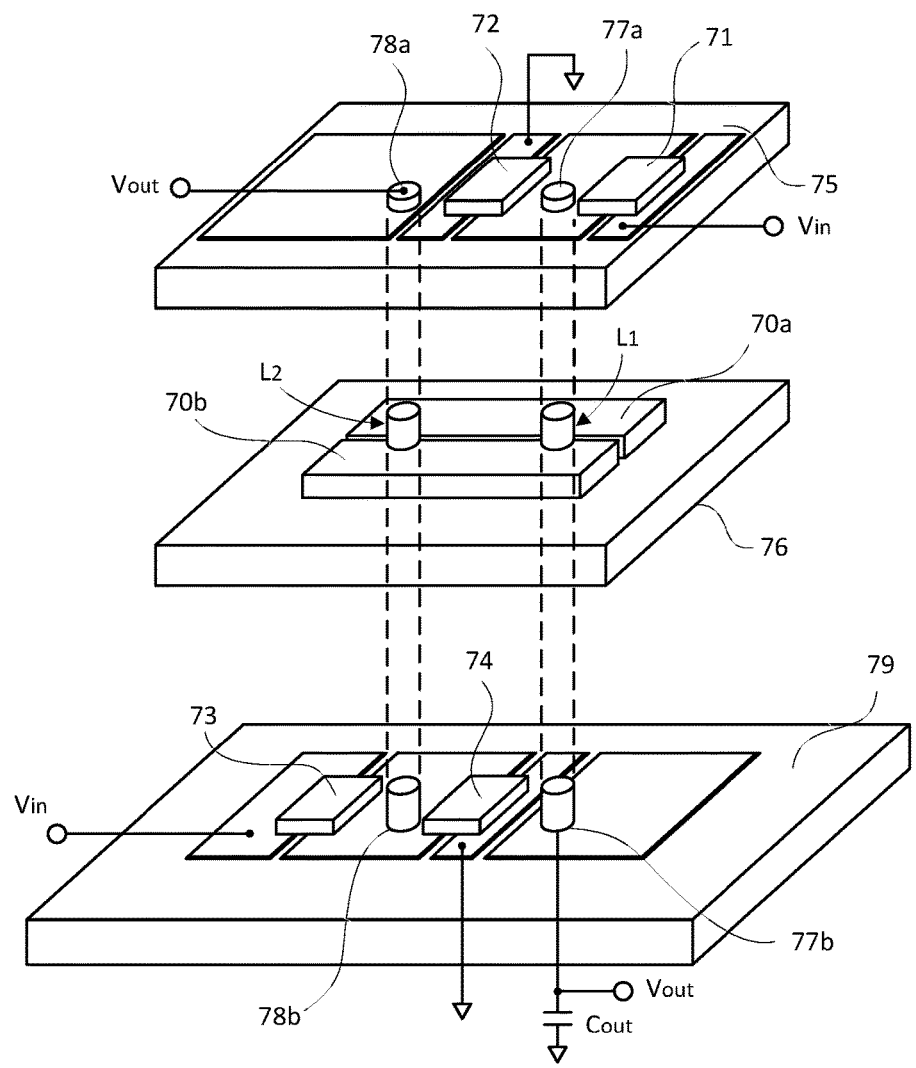
FIG. 7 shows an exploded view of the second embodiment in a two-phase converter of the present invention implemented in printed circuit board of a converter module and a motherboard.

FIG. 7 shows an exploded perspective view of a second embodiment of the present invention in which the magnetic cores 70a, 70b are embedded between the printed circuit board layers 75, 76 of the converter module with the first pair of switches on top side of printed circuit board of the converter module and the second pair of switches on top side of the motherboard layer 79. The first top and bottom switches 71, 72 are placed on top side of the printed circuit board layer 75 and connected in series between the input voltage source Vin and ground. The two switches are connected at a midpoint to top end 77a of the conductor of inductor L1. The bottom end 77b of the conductor of inductor L1 is connected to the converter voltage output Vout on top side of the motherboard layer 79. All the above connections are through patterned copper foil on the printed circuit board layers.

The second top and bottom switches 73, 74 are connected in series between the input voltage source Vin and ground. The two switches are placed on top side of the motherboard layer 79 and connected at a midpoint to bottom end 78b of the conductor of inductor L2. The top end 78a of the conductor of inductor L2 is connected to the converter voltage output Vout on top side of the printed circuit board layer 75 of the converter module. All the above connections are through patterned copper foil on the printed circuit board layers.

In the present invention, the conductors of coupled inductors L1, L2 are non-looping and have a relatively short length. So the inductors have a relatively low resistance compared to the prior art coupled inductors. Hence, the present coupled inductor provides greater energy conversion efficiency in a buck or boost or buck-boost converter.

Figure 8:
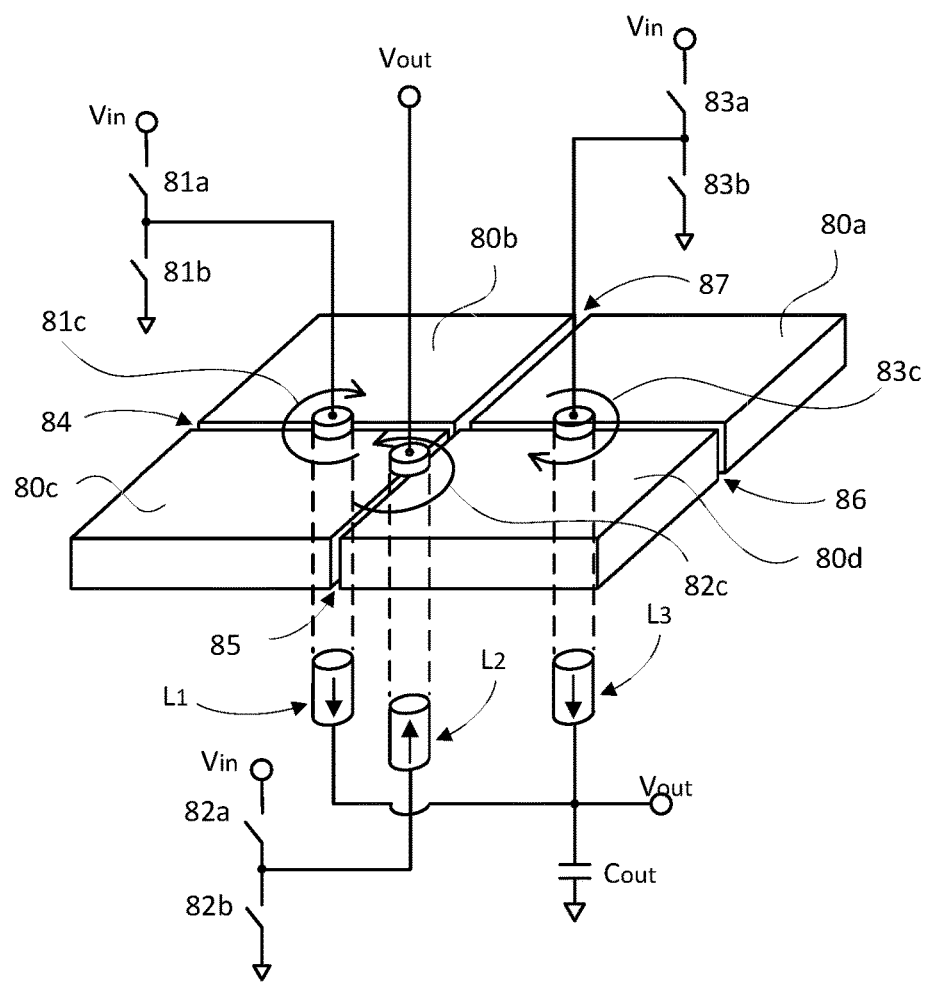
FIG. 8 shows the inductors according to the present invention for a three-phase buck converter.

FIG. 8 shows an exploded perspective view of a three-phase buck converter with the coupled inductor according to the present invention. The buck converter has three phases. A first phase includes top and bottom switches 81a, 81b, and first inductor L1. A second phase includes top and bottom switches 82a, 82b, and second inductor L2. A third phase includes top and bottom switches 83a, 83b, and third inductor L3. The three phases operate in parallel and are connected at the converter voltage output Vout. The conductors of inductors L1, L2, L3 are preferably copper wires or vias with plating in a printed circuit board, but can be any kind of electrical conductor. The cross section of the conductors is preferably round but can be square or any other shapes.

The buck converter of FIG. 8 includes the lateral magnetic cores 80a, 80b, 80c, 80d and three non-looping conductors of inductors L1, L2, L3. The magnetic cores can be made of any ferromagnetic material such as ferrite or laminated iron or steel. The top end of the conductor of inductor L1 is connected to the midpoint of the switches 81a, 81b, and the bottom end of the conductor of inductor L1 is connected to the converter voltage output Vout. The top end of the conductor of inductor L2 is connected to the converter voltage output Vout, and the bottom end of the conductor of inductor L2 is connected to the midpoint of the switches 82a, 82b. The top end of the conductor of inductor L3 is connected to the midpoint of the switches 83a, 83b, and the bottom end of the conductor of inductor L3 is connected to the converter voltage output Vout.

In operation, the inductor L1 receives electrical power from the switches 81a, 81b, the inductor L2 receives electrical power from the switches 82a, 82b, and the inductor L3 receives electrical power from the switches 83a, 83b, as known in the art. The non-looping conductors of inductors L1, L3, with the described connections to the switches 81a, 81b, 83a, 83b and the converter voltage output Vout, produce opposing magnetic fields to inductor L2 within the magnetic core. Specifically, inductors L1, L3 produce a magnetic field with an orientation indicated by arrows 81c, 83c, which is opposite of the magnetic field produced by inductor L2 with an orientation indicated by arrow 82c. Hence, the inductors L1, L3 are inversely coupled with the inductor L2, as desired. It is clear from FIG. 8 that the conductors of inductors L1, L2, L3 are non-looping and have relatively short length in comparison with the prior art. The relatively short length of the conductors of inductors L1, L2, L3 reduces the electrical resistance of the inductors. The relatively low electrical resistance of the inductors increases the energy conversion efficiency of the converter, which is desirable.

The inductors L1, L3 are coupled to inductor L2 by the magnetic cores 80a, 80b, 80c, 80d, which are typically made of ferrite or similar material, as known in the art. The magnetic cores can have the air gaps 84, 85, 86, 87 to prevent magnetic saturation and control the coupling between the inductors L1, L3 and inductor L2. The air gap 87 is larger than air gaps 84, 85, 86 to reduce coupling between inductors L1 and L3. The air gaps can also be filled with magnetic materials having lower permeability than material of the magnetic cores 80a, 80b, 80c, 80d, or be partially filled with a ferromagnetic material.

Figure 9:
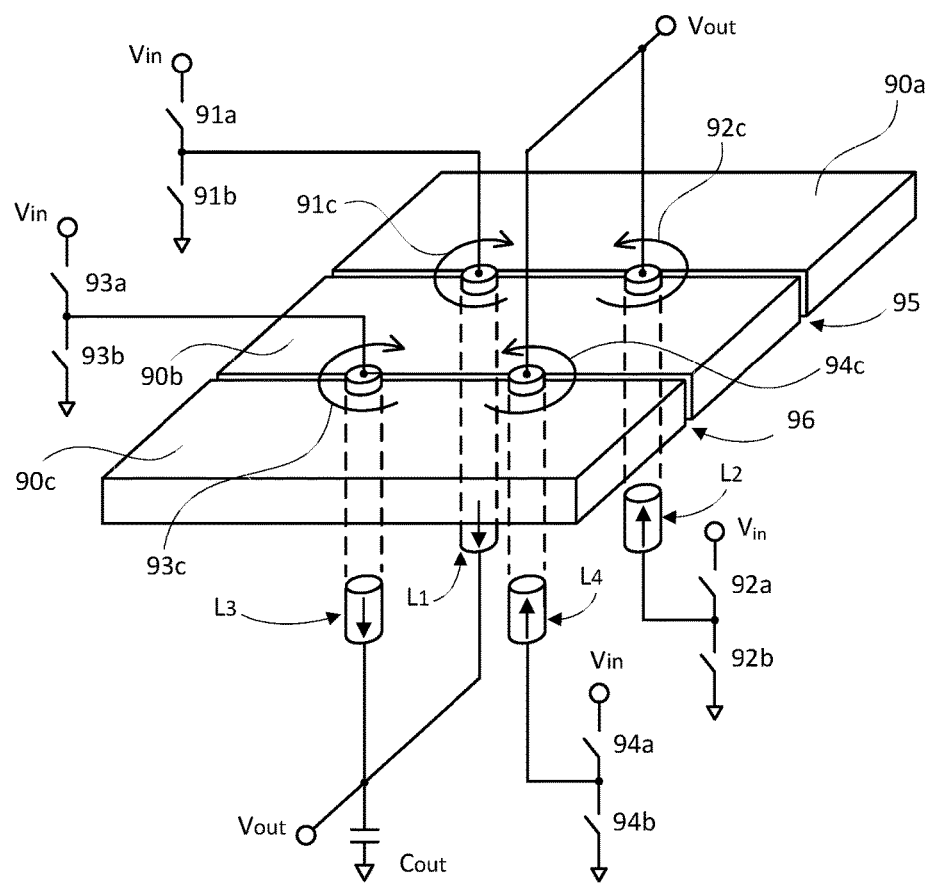
FIG. 9 shows the inductors according to the present invention for a four-phase buck converter.

FIG. 9 shows an exploded perspective view of a four-phase buck converter with the coupled inductor according to the present invention. The buck converter has four phases. A first phase includes top and bottom switches 91a, 91b, and first inductor L1. A second phase includes top and bottom switches 92a, 92b, and second inductor L2. A third phase includes top and bottom switches 93a, 93b, and third inductor L3. A fourth phase includes top and bottom switches 94a, 94b, and fourth inductor L4. The four phases operate in parallel and are connected at the converter voltage output Vout. The conductors of inductors L1, L2, L3, L4 are preferably copper wires or vias with plating in a printed circuit board, but can be any kind of electrical conductor. The cross section of the conductors is preferably round but can be square or any other shapes.

The buck converter of FIG. 9 includes the lateral magnetic cores 90a, 90b, 90c, and four non-looping conductors of inductors L1, L2, L3, L4. The magnetic cores can be made of any ferromagnetic material such as ferrite or laminated iron or steel. The top end of the conductor of inductor L1 is connected to the midpoint of the switches 91a, 91b, and the bottom end of the conductor of inductor L1 is connected to the converter voltage output Vout. The top end of the conductor of inductor L2 is connected to the converter voltage output Vout, and the bottom end of the conductor of inductor L2 is connected to the midpoint of the switches 92a, 92b. The top end of the conductor of inductor L3 is connected to the midpoint of the switches 93a, 93b, and the bottom end of the conductor of inductor L3 is connected to the converter voltage output Vout. The top end of the conductor of inductor L4 is connected to the converter voltage output Vout, and the bottom end of the conductor of inductor L4 is connected to the midpoint of the switches 94a, 94b.

In operation, the inductor L1 receives electrical power from the switches 91a, 91b, the inductor L2 receives electrical power from the switches 92a, 92b, the inductor L3 receives electrical power from the switches 93a, 93b, and the inductor L4 receives electrical power from the switches 94a, 94b, as known in the art. The non-looping conductors of inductors L1, L2, with the described connections to the switches 91a, 91b, 92a, 92b and the converter voltage output Vout, produce opposing magnetic fields within the magnetic cores. Specifically, inductor L1 produces a magnetic field with an orientation indicated by arrows 91c, which is opposite of the magnetic field produced by inductor L2 with an orientation indicated by arrow 92c. Hence, the inductors L1, L2 are inversely coupled, as desired. The non-looping conductors of inductors L3, L4, with the described connections to the switches 93a, 93b, 94a, 94b and the converter voltage output Vout, produce opposing magnetic fields within the magnetic cores. Specifically, inductor L3 produces a magnetic field with an orientation indicated by arrows 93c, which is opposite of the magnetic field produced by inductor L4 with an orientation indicated by arrow 94c. Hence, the inductors L3, L4 are inversely coupled, as desired.

It is clear from FIG. 9 that the conductors of inductors L1, L2, L3, L4 are non-looping and have relatively short length in comparison with the prior art. The relatively short length of the conductors of inductors L1, L2, L3, L4 reduces the electrical resistance of the inductors. The relatively low electrical resistance of the inductors increases the energy conversion efficiency of the converter, which is desirable.

The inductors L1, L3 are coupled to the inductors L2, L4 by the magnetic cores 90a, 90b, 90c, which are typically made of ferrite or similar material, as known in the art. The magnetic cores 90a, 90b, 90c can have air gaps 95, 96 to prevent magnetic saturation and control the coupling between inductors L1, L2, L3, L4. The air gaps can also be filled with magnetic materials having lower permeability than material of the magnetic cores 90a, 90b, 90c, or be partially filled with a ferromagnetic material.

Figure 10:
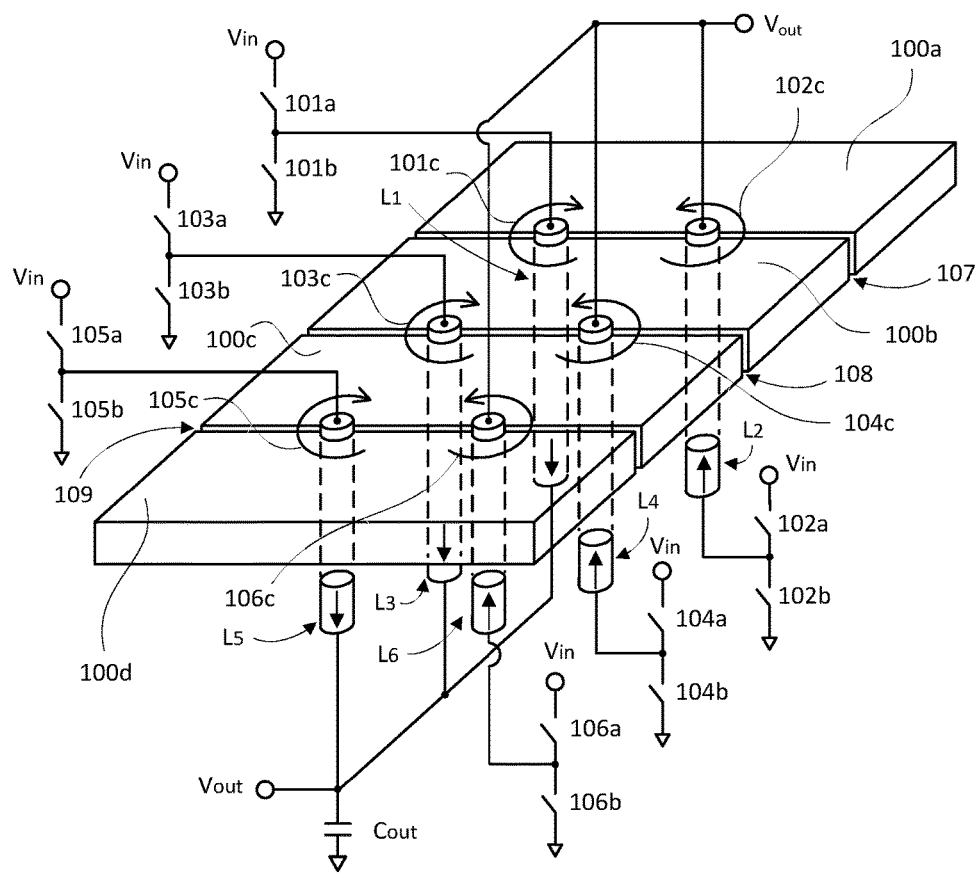
FIG. 10 shows the inductors according to the present invention for a six-phase buck converter.

FIG. 10 shows an exploded perspective view of a six-phase buck converter with the coupled inductor according to the present invention. The buck converter has six phases. A first phase includes top and bottom switches 101a, 101b, and first inductor L1. A second phase includes top and bottom switches 102a, 102b, and second inductor L2. A third phase includes top and bottom switches 103a, 103b, and third inductor L3. A fourth phase includes top and bottom switches 104a, 104b, and fourth inductor L4. A fifth phase includes top and bottom switches 105a, 105b, and fifth inductor L5. A sixth phase includes top and bottom switches 106a, 106b, and sixth inductor L6. The six phases operate in parallel and are connected at the converter voltage output Vout. The conductors of inductors L1, L2, L3, L4, L5, L6 are preferably copper wires or vias with plating in a printed circuit board, but can be any kind of electrical conductor. The cross section of the conductors is preferably round but can be square or any other shapes.

The buck converter of FIG. 10 includes the lateral magnetic cores 100a, 100b, 100c, 100d and six non-looping conductors of inductors L1, L2, L3, L4, L5, L6. The magnetic core can be made of any ferromagnetic material such as ferrite or laminated iron or steel. The top end of the conductor of inductor L1 is connected to the midpoint of the switches 101a, 101b, and the bottom end of the conductor of inductor L1 is connected to the converter voltage output Vout. The top end of the conductor of inductor L2 is connected to the converter voltage output Vout, and the bottom end of the conductor of inductor L2 is connected to the midpoint of the switches 102a, 102b. The top end of the conductor of inductor L3 is connected to the midpoint of the switches 103a, 103b, and the bottom end of the conductor of inductor L3 is connected to the converter voltage output Vout. The top end of the conductor of inductor L4 is connected to the converter voltage output Vout, and the bottom end of the conductor of inductor L4 is connected to the midpoint of the switches 104a, 104b. The top end of the conductor of inductor L5 is connected to the midpoint of the switches 105a, 105b, and the bottom end of the conductor of inductor L5 is connected to the converter voltage output Vout. The top end of the conductor of inductor L6 is connected to the converter voltage output Vout, and the bottom end of the conductor of inductor L6 is connected to the midpoint of the switches 106a, 106b.

In operation, the inductor L1 receives electrical power from the switches 101a, 101b, the inductor L2 receives electrical power from the switches 102a, 102b, the inductor L3 receives electrical power from the switches 103a, 103b, the inductor L4 receives electrical power from the switches 104a, 104b, the inductor L5 receives electrical power from the switches 105a, 105b, and the inductor L6 receives electrical power from the switches 106a, 106b, as known in the art. The non-looping conductors of inductors L1, L2 with the described connections to the switches 101a, 101b, 102a, 102b and the converter voltage output Vout, produce opposing magnetic fields within the magnetic cores. Specifically, inductor L1 produces a magnetic field with an orientation indicated by arrows 101c, which is opposite of the magnetic field produced by inductor L2 with an orientation indicated by arrow 102c. Hence, the inductors L1, L2 are inversely coupled, as desired. The non-looping conductors of inductors L3, L4, with the described connections to the switches 103a, 103b, 104a, 104b and the converter voltage output Vout, produce opposing magnetic fields within the magnetic cores. Specifically, inductor L3 produces a magnetic field with an orientation indicated by arrows 103c, which is opposite of the magnetic field produced by inductor L4 with an orientation indicated by arrow 104c. Hence, the inductors L3, L4 are inversely coupled, as desired. The non-looping conductors of inductors L5, L6, with the described connections to the switches 105a, 105b, 106a, 106b and the converter voltage output Vout, produce opposing magnetic fields within the magnetic cores. Specifically, inductor L5 produces a magnetic field with an orientation indicated by arrows 105c, which is opposite of the magnetic field produced by inductor L6 with an orientation indicated by arrow 106c. Hence, the inductors L5, L6 are inversely coupled, as desired.

It is clear from FIG. 10 that the conductors of inductors L1, L2, L3, L4, L5, L6 are non-looping and have relatively short length in comparison with the prior art. The relatively short length of the conductors of inductors L1, L2, L3, L4, L5, L6 reduces the electrical resistance of the inductors. The relatively low electrical resistance of the inductors increases the energy conversion efficiency of the converter, which is desirable.

The inductors L1, L3, L5 are coupled to the inductors L2, L4, L6 by the magnetic cores 100a, 100b, 100c, 100d, which are typically made of ferrite or similar material, as known in the art. The magnetic cores 100a, 100b, 100c, 100d can have air gaps 107, 108, 109 to prevent magnetic saturation and control the coupling between inductors L1, L2, L3, L4, L5, L6. The air gaps can also be filled with magnetic materials having lower permeability than material of the magnetic cores 100a, 100b, 100c, 100d, or be partially filled with a ferromagnetic material.

Figure 11:
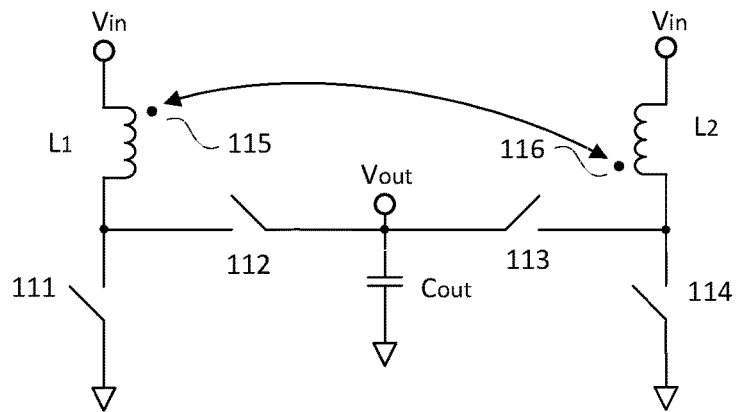
FIG. 11 shows a circuit diagram of a two-phase boost converter which can employ the inversely coupled inductors of the present invention.

FIG. 11 shows a circuit diagram of a two-phase boost converter. The first phase has top and bottom switches 111, 112, and the second phase has top and bottom switches 113, 114. The switches alternately charge and discharge the coupled inductors L1, L2. The coupled inductors L1, L2 in the boost converter can have the structure according to the present invention and illustrated in FIG. 5, 6, 7, 8, 9, or 10. However, the connections of switches 111, 112, 113, 114, input voltage source Vin and converter voltage output Vout must be rearranged according to FIG. 11, which is apparent from inspection.

Figure 12:
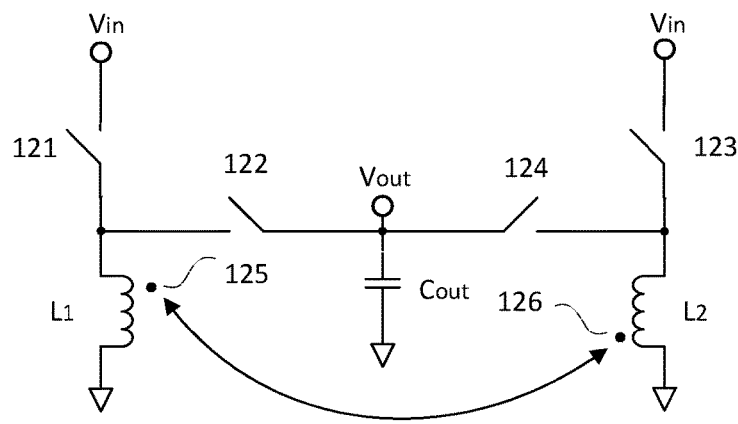
FIG. 12 shows a circuit diagram of a two-phase buck-boost converter which can employ the inversely coupled inductors of the present invention.

FIG. 12 shows a circuit diagram of a two-phase buck-boost converter. The first phase has top and bottom switches 121, 122, and the second phase has top and bottom switches 123, 124. The switches alternately charge and discharge the coupled inductors L1, L2. The coupled inductors L1, L2 in the buck-boost converter can have the structure according to the present invention and illustrated in FIG. 5, 6, 7, 8, 9 or 10. However, the connections of switches 121, 122, 123, 124, input voltage source Vin and converter voltage output Vout must be rearranged according to FIG. 12, which is apparent from inspection.

Figure 13:
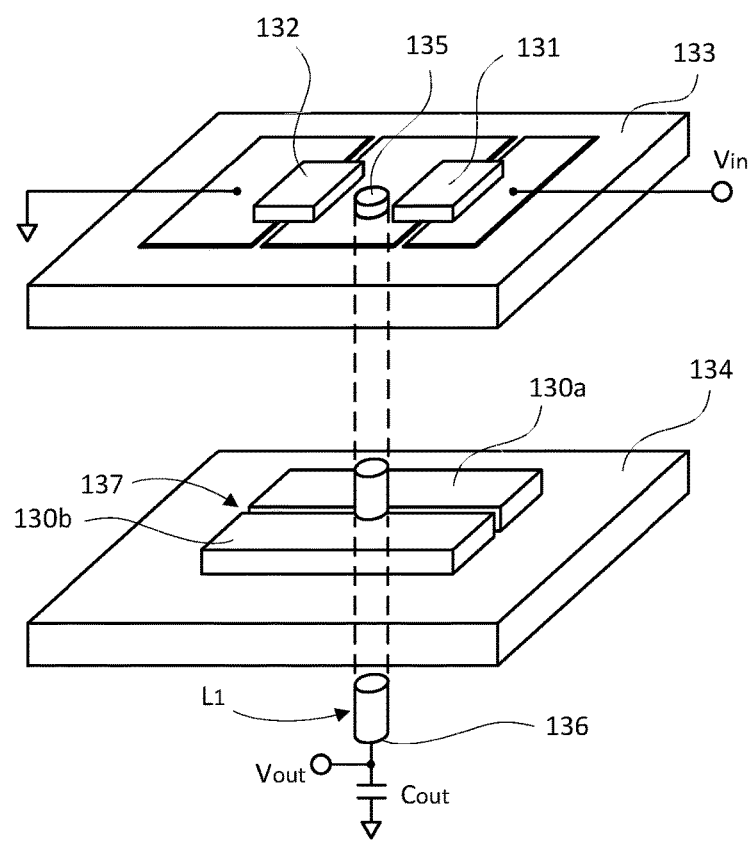
FIG. 13 shows an exploded view of an embodiment in a one-phase converter of the present invention implemented in a printed circuit board of converter module or a motherboard.

FIG. 13 shows an exploded perspective view of a preferred embodiment of the present invention in a single phase converter. The magnetic cores 130a, 130b are embedded between the printed circuit board layers 133, 134 of a converter module or a motherboard. The top and bottom switches 131, 132 are placed on top side of the printed circuit board layer 133 and connected in series between the input voltage source Vin and ground. The two switches are connected at a midpoint to top end 135 of the conductor of inductor L1. The bottom end 136 of the conductor of inductor L1 is connected to the converter voltage output Vout. All the above connections are through patterned copper foil on the printed circuit board layers.

The magnetic core 130 can have the air gap 137 to prevent magnetic saturation. The air gap can also be filled with magnetic materials having lower permeability than material of the magnetic core 130 or be partially filled with a ferromagnetic material.

In the present invention, the conductor of the inductor L1 is non-looping and has a relatively short length. So the inductor L1 has a relatively low resistance compared to the prior art inductor. Hence, the present inductor provides greater energy conversion efficiency in a buck or boost or buck-boost converter.

Figure 14:
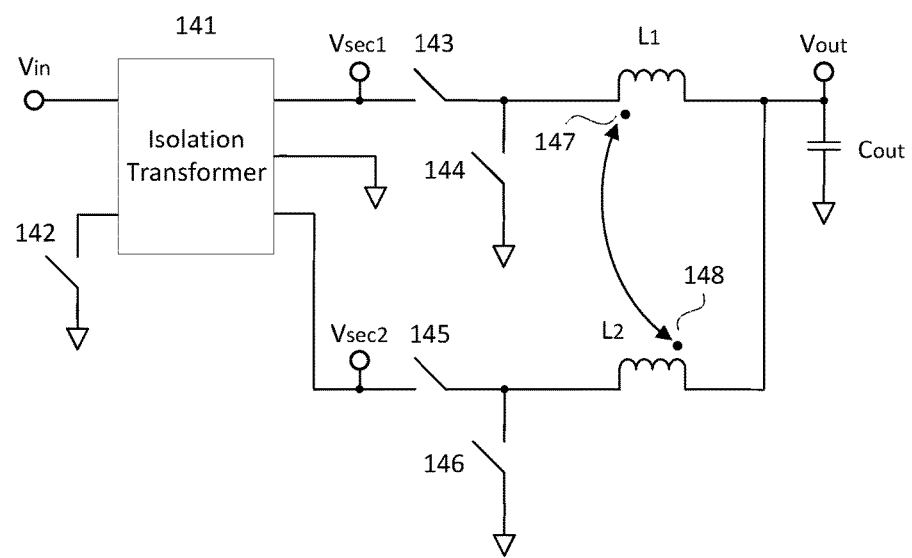
FIG. 14 shows a circuit diagram of a two-phase buck-derived converter with isolation transformers which can employ the inversely coupled inductors of the present invention.

FIG. 14 shows a circuit diagram of a two-phase buck-derived converter with an isolation transformer. There is an isolation transformer 141 with a switch 142 at primary side of the transformer. The transformer is between an input voltage source Vin and a two-phase switching converter. The first phase has an inductor L1, and top and bottom switches 143 and 144 at secondary side of the transformer. The second phase has an inductor L2, and top and bottom switches 145 and 146 at secondary side of the transformer. The top and bottom switches alternately charge and discharge the coupled inductors L1, L2. The coupled inductors L1, L2 in the buck-derived converter with the isolation transformer can have the structure according to the present invention and illustrated in FIG. 5, 6, 7, 8, 9 or 10. However, the connections of the transformer secondary side Vsec1 and Vsec2, switches 143, 144, 145 and 146, and converter voltage output Vout must be rearranged according to FIG. 14, which is apparent from inspection.

The present invention provides multiphase and single-phase buck, boost, buck-boost, buck derived, boost derived, buck-boost derived voltage converters with exceptionally high energy efficiency and exceptionally fast transient response. The inductors have very low electrical resistance values since they are non-looping and have relatively short lengths. The inductors have very low core loss since the magnetic core volume is relatively small. The unique structure of the coupled inductors allows the inductors to have a minimal conductor resistance. The multiphase voltage converters of the present invention can operate at high frequencies, e.g. 1 MHz or higher. The present multiphase converters can be used to increase or decrease the voltage and reverse the polarity of the voltage of a power supply. The present multiphase converters can be used in a wide range of applications such as for powering microprocessors, computer graphic processors, computers memories, telecommunications equipment, and linear or analog signal electronics, and field-programmable gate array integrated circuits.

It will be clear to one skilled in the art that the above embodiment may be altered in many ways without departing from the scope of the invention. For example, the shapes of the magnetic cores and conductors of the inductor can be changed in many ways without departing from the present invention and scope of the appended claims. Accordingly, the scope of the invention should be determined by the following claims and their legal equivalents.

What is claimed is:

1. A multiphase coupled inductor for a multiphase voltage converter, comprising:
   a) a magnetic core having
      1) a straight core structure extending, in a first plane, along a first linear axis,
      2) an air gap extending, in the first plane, along said first linear axis;
   b) a first inductor comprising a non-looping electrical conductor extending, in a second plane, linearly from a first inductor conductor first end to a first inductor conductor second end, along a second linear axis; and
   c) a second inductor comprising a non-looping electrical conductor extending, in a plane parallel to the second plane, linearly from a second inductor conductor first end to a second inductor conductor second end, along a linear axis parallel to the said second linear axis.

2. The multiphase coupled inductor of claim 1, wherein the first linear axis and said second linear axis are essentially perpendicular.

3. The multiphase coupled inductor of claim 1, wherein the first plane and said second plane are essentially perpendicular.

4. The voltage converter of claim 1, further comprising a transformer that provides isolation between input voltage source and converter voltage output.

5. The voltage converter of claim 1, further comprising a magnetic core having air gap(s) filled with low permeability material or partially filled with a ferromagnetic material.

6. A multiphase voltage converter, comprising:
   a) a magnetic core;
   b) a first phase circuit comprising
      1) a first inductor conductor that is non-looping with respect to the magnetic core,
      2) first top and bottom switches connected to a first inductor conductor first end,
      3) a converter voltage output connected to a first inductor conductor second end, and
      4) the first top and bottom switches operable for alternately charging and discharging the first inductor; and
   c) a second phase circuit comprising
      1) a second inductor conductor that is non-looping with respect to the magnetic core,
      2) second top and bottom switches connected to a second inductor conductor second end,
      3) the converter voltage output connected to a second inductor conductor first end, and
      4) the second top and bottom switches operable for alternately charging and discharging the second inductor, wherein
   the magnetic core is constructed with an air gap and said construction and arrangement including:
      i) a straight core structure, extending in a first plane, along a first linear axis,
      ii) an air gap extending, in the first plane, along said first linear axis,
   said first inductor extending, in a second plane, linearly from the first inductor conductor first end to the first inductor conductor second end, along a second linear axis, and
   said second inductor extending, in the second plane, linearly from the second inductor conductor first end to the second inductor conductor second end, along a linear axis parallel to the said second linear axis.

7. The multiphase voltage converter of claim 6, wherein connections of the top and bottom switches of the first and second phase circuits to said first and second inductors such that the first and second inductors are inversely coupled through said magnetic core.

8. The multiphase voltage converter of claim 6, wherein the first linear axis and said second linear axis are essentially perpendicular.

9. The multiphase voltage converter of claim 6, wherein the first plane and said second plane are essentially perpendicular.

10. The multiphase voltage converter of claim 6, further comprising a third phase circuit comprising:
    a) a third inductor that is non-looping with respect to the magnetic core, extending, in a plane parallel to said second plane, linearly from a third inductor conductor first end to a third inductor second end, along a linear axis parallel to said second linear axis,
    b) third top and bottom switches connected to the third inductor conductor first end,
    c) the converter voltage output connected to the third inductor conductor second end, and
    d) the third top and bottom switches operable for alternately charging and discharging the third inductor; wherein
    said magnetic core further comprises
    a second air gap extending, in the first plane, along a linear axis perpendicular to said first linear axis,
    connections of top and bottom switches of the first and second phase circuits to said first and second inductors such that the first and second inductors are inversely coupled through said magnetic core,
    connections of top and bottom switches of the second and third phase circuits to said second and third inductors such that the second and third inductors are inversely coupled through said magnetic core.

11. The multiphase voltage converter of claim 6, further comprising a third phase circuit comprising:
    a) a third inductor that is non-looping with respect to the magnetic core, extending, in a plane parallel to said second plane, linearly from a third inductor conductor first end to a third inductor second end, along a linear axis parallel to said second linear axis,
    b) third top and bottom switches connected to the third inductor conductor first end,
    c) the converter voltage output connected to the third inductor conductor second end, and d) the third top and bottom switches operable for alternately charging and discharging the third inductor;
a fourth phase circuit comprising:
a) a fourth inductor that is non-looping with respect to the magnetic core, extending, in a plane parallel to said second plane, linearly from a fourth inductor conductor first end to a fourth inductor second end, along a linear axis parallel to said second linear axis,
b) fourth top and bottom switches connected to the fourth inductor conductor second end,
c) the converter voltage output connected to the fourth inductor conductor first end, and
d) the fourth top and bottom switches operable for alternately charging and discharging the fourth inductor, wherein
said magnetic core further comprises
a second air gap extending, in the first plane, along said first linear axis,
connections of top and bottom switches of the third and fourth phase circuits to said third and fourth inductors such that the third and fourth inductors are inversely coupled through said magnetic core.

12. The multiphase voltage converter of claim 11, further comprising a fifth phase circuit comprising:
a) a fifth inductor that is non-looping with respect to the magnetic core, extending, in a plane parallel to said second plane, linearly from a fifth inductor conductor first end to a fifth inductor second end, along a linear axis parallel to said second linear axis,
b) fifth top and bottom switches connected to the fifth inductor conductor first end,
c) the converter voltage output connected to the fifth inductor conductor second end, and
d) the fifth top and bottom switches operable for alternately charging and discharging the fifth inductor;
a sixth phase circuit comprising:
a) a sixth inductor that is non-looping with respect to the magnetic core, extending, in a plane parallel to said second plane, linearly from a sixth inductor conductor first end to a sixth inductor second end, along a linear axis parallel to said second linear axis,
b) sixth top and bottom switches connected to the sixth inductor conductor second end,
c) the converter voltage output connected to the sixth inductor conductor first end, and
d) the sixth top and bottom switches operable for alternately charging and discharging the sixth inductor, wherein
said magnetic core further comprises
a third air gap extending, in the first plane, along said first linear axis,
connections of top and bottom switches of the fifth and sixth phase circuits to said fifth and sixth inductors such that the fifth and sixth inductors are inversely coupled through said magnetic core.

13. The multiphase voltage converter of claim 12, further comprising a seventh phase circuit comprising:
a) a seventh inductor that is non-looping with respect to the magnetic core, extending, in a plane parallel to said second plane, linearly from a seventh inductor conductor first end to a seventh inductor second end, along a linear axis parallel to said second linear axis,
b) seventh top and bottom switches connected to the seventh inductor conductor first end,
c) the converter voltage output connected to the seventh inductor conductor second end, and
d) the seventh top and bottom switches operable for alternately charging and discharging the seventh inductor;
an eighth phase circuit comprising:
a) an eighth inductor that is non-looping with respect to the magnetic core, extending, in a plane parallel to said second plane, linearly from an eighth inductor conductor first end to an eighth inductor second end, along a linear axis parallel to said second linear axis,
b) eighth top and bottom switches connected to the eighth inductor conductor second end,
c) the converter voltage output connected to the eighth inductor conductor first end, and
d) the eighth top and bottom switches operable for alternately charging and discharging the eighth inductor, wherein
said magnetic core further comprises
a fourth air gap extending, in the first plane, along said first linear axis,
connections of top and bottom switches of the seventh and eighth phase circuits to said seventh and eighth inductors such that the seventh and eighth inductors are inversely coupled through said magnetic core.

14. A multiphase voltage converter, comprising:
a) a magnetic core comprising
1) a straight core structure extending, in a first plane, along a first linear axis,
2) an air gap extending, in the first plane, along said first linear axis;
b) a first phase circuit comprising:
1) a first inductor that is non-looping with respect to the magnetic core, extending in a second plane, linearly from a first inductor conductor first end to a first inductor conductor second end, along a second linear axis, and
2) first top and bottom switches that are constructed and arranged to alternately charge and discharge the first inductor;
c) a second phase circuit comprising:
1) a second inductor that is non-looping with respect to the magnetic core extending in a plane parallel to said second plane, linearly from a second inductor first end to a second inductor second end, along a second linear axis, and
2) second top and bottom switches that are constructed and arranged to alternately charge and discharge the second inductor, wherein
connections of top and bottom switches of the first and second phase circuits to said first and second inductors such that the first and second inductors are inversely coupled through said magnetic core.

15. The voltage converter of claim 14, further comprising a transformer that provides isolation between input voltage source and converter voltage output.

16. The voltage converter of claim 14, further comprising a magnetic core having air gap(s) filled with low permeability material or partially filled with a ferromagnetic material.

17. The voltage converter of claim 6, further comprising a transformer that provides isolation between input voltage source and converter voltage output.

18. The voltage converter of claim 6, further comprising a magnetic core having air gap(s) filled with low permeability material or partially filled with a ferromagnetic material.

19. A single phase voltage converter, comprising:
a) a magnetic core comprising
   1) a straight core structure extending, in a first plane, along a first linear axis,
   2) an air gap extending, in the first plane, along said first linear axis;
b) a single phase circuit comprising:
   1) an inductor that is non-looping with respect to the magnetic core, extending in a second plane, linearly from an inductor conductor first end to an inductor conductor second end, along a second linear axis, wherein the inductor is connected between a midpoint of top and bottom switches and ground, and the switches are constructed and arranged to alternately charge and discharge the inductor, and
   2) top and bottom switches connected in series between a voltage source and ground.

* * * * *